United States Patent
Todhunter (10) Patent No.: US 7,805,455 B2
(45) Date of Patent: Sep. 28, 2010

(54) SYSTEM AND METHOD FOR PROBLEM ANALYSIS

(75) Inventor: James Todhunter, Framingham, MA (US)

(73) Assignee: Invention Machine Corporation, Boston, MA (US)

(*) Notice: Subject to any disclaimer, the term of this patent is extended or adjusted under 35 U.S.C. 154(b) by 819 days.

(21) Appl. No.: 11/273,137

(22) Filed: Nov. 14, 2005

(65) Prior Publication Data

US 2007/0112746 A1 May 17, 2007

(51) Int. Cl.
G06F 7/00 (2006.01)
G06F 17/30 (2006.01)

(52) U.S. Cl. ...................................................... 707/759
(58) Field of Classification Search ................. 707/759, 707/999.003
See application file for complete search history.

(56) References Cited

U.S. PATENT DOCUMENTS

| | | | |
|---|---|---|---|
| 5,404,295 A | 4/1995 | Katz et al. | |
| 5,418,889 A | 5/1995 | Ito | |
| 5,694,592 A | 12/1997 | Driscoll | |
| 5,724,571 A | 3/1998 | Woods | |
| 5,794,050 A | 8/1998 | Dahlgren et al. | |
| 5,933,822 A | 8/1999 | Braden-Harder et al. | |
| 5,966,686 A | 10/1999 | Heidorn et al. | |
| 6,056,428 A | 5/2000 | Devoino et al. | |
| 6,167,370 A | 12/2000 | Tsourikov et al. | |
| 6,185,592 B1 | 2/2001 | Boguraev et al. | |
| 6,202,043 B1 | 3/2001 | Devoino et al. | |
| 6,212,494 B1 | 4/2001 | Boguraev | |
| 6,263,335 B1 | 7/2001 | Paik et al. | |
| 6,381,598 B1 | 4/2002 | Williamowski et al. | |
| 6,459,949 B1 * | 10/2002 | Black et al. ................. 700/121 |
| 6,557,011 B1 * | 4/2003 | Sevitsky et al. .......... 707/104.1 |
| 6,701,345 B1 * | 3/2004 | Carley et al. ................. 709/205 |
| 6,754,654 B1 | 6/2004 | Kim et al. | |
| 6,823,325 B1 | 11/2004 | Davies et al. | |
| 6,871,199 B1 | 3/2005 | Binnig et al. | |
| 6,876,988 B2 | 4/2005 | Helsper et al. | |
| 7,035,877 B2 * | 4/2006 | Markham et al. ........... 707/200 |
| 2002/0010574 A1 | 1/2002 | Tsourikov et al. | |
| 2002/0103793 A1 * | 8/2002 | Koller et al. .................. 707/3 |
| 2002/0116176 A1 | 8/2002 | Tsourikov et al. | |
| 2002/0184206 A1 | 12/2002 | Evans | |

(Continued)

FOREIGN PATENT DOCUMENTS

WO 9708604 3/1997

OTHER PUBLICATIONS

Feng, L., et al., "Beyond information searching and browsing: acquiring knowledge from digital libraries", Information Processing and Management, 41 (2005), pp. 97-120.

(Continued)

*Primary Examiner*—John E Breene
*Assistant Examiner*—Aleksandr Kerzhner
(74) *Attorney, Agent, or Firm*—Mills & Onello, LLP; David M. Mello (57) ABSTRACT

Problem analysis system, given either half of a cause-effect relationship, automatically formulates a natural language or Boolean query that is automatically submitted via a knowledge search tool to a database of cause-effect relationships, and responses to this query from the database are automatically provided.

23 Claims, 6 Drawing Sheets

U.S. PATENT DOCUMENTS

| | | |
|---|---|---|
| 2003/0130837 A1 | 7/2003 | Batchilo et al. |
| 2004/0261021 A1 | 12/2004 | Mittal et al. |
| 2005/0114282 A1 | 5/2005 | Todhunter |
| 2005/0131874 A1 | 6/2005 | Verbitsky |
| 2006/0041424 A1 | 2/2006 | Todhunter et al. |

OTHER PUBLICATIONS

Girju, R., "Automatic Detection of Causal Relations for Question Answering", XP-002427020, pp. 76-83.

Chang, D., et al., "Causal Relation Extraction Using Cue Phrase and Lexical Pair Probabilities", XP-002427022, pp. 61-70.

Paice, C., et al., "The Use of Causal Expressions for Abstracting and Question Answering", XP-002427857, 7 pp.

Khoo, C., et al., "Extracting Causal Knowledge from a Medical Database Using Graphical Patterns", XP-002427019, pp. 336-343.

Girju, R., "Automatic Detection of Causal Relations for Question Answering", XP-002427020, pp. 76-83.

Chang, D., et al., "Causal Relation Extraction Using Cue Phrase and Lexical Pair Probabilities", XP-002427022, pp. 61-70.

Paice, C., et al., "The Use of Causal Expressions for Abstracting and Question Answering", XP-002427857, 7 pp.

Khoo, C., et al., "Extracting Causal Knowledge from a Medical Database Using Graphical Patterns", XP-002427019, pp. 336-343.

Chan, Ki, et al., "Extracting Causation Knowledge from Natural Language Texts", XP-002427021, Department of Systems Engineering and Engineering Management, The Chinese University of Hong Kong, pp. 555-560.

Radev, D.R., et al., "Ranking Suspected Answers to Natural Language Question Using Predictive Annotation", Proceedings of the 6th Applied Natural Language Processing Conference, Apr. 29-May 4, 2000, pp. 150-157.

Srihari, R., et al., "A Question Answering System Supported by Information Extraction", Proceedings of the 6th Applied Natural Language Processing Conference, Apr. 29-May 4, 2000, pp. 166-172.

Cardie, C., et al., "Examining the Role of Statistical and Linguistic Knowledge Sources in a General-Knowledge Question-Answering System", Proceedings of the 6th Applied Natural Language Processing Conference, Apr. 29-May 4, 2000, pp. 180-187.

Abney, S., et al., "Answer Extraction", Proceedings of the 6th Applied Natural Language Processing Conference, Apr. 29-May 4, 2000, pp. 296-301.

Amaral, Carlos, et al., "Design and Implementation of a Semantic Search Engine for Portuguese", XP-002427855, http://www.trustsemantics.com.

Neumann, Gunter, et al., "A Cross-Language Question/Answering System for German and English", XP-002427856, LT-Lab, DFKI, Saarbrucken, Germany.

Volk, Martin, et al., "Semantic Annotation for Concept-Based Cross-Language Medical Information Retrieval", International Journal of Medical Informatics 67 (2002), pp. 97-112.

Khoo, Christopher S.G., et al., "Automatic Extraction of Cause-Effect Information from Newspaper Text Without Knowledge-Based Inferencing", XP-002427013, Literary and Linguistic Computing, vol. 13, No. 4, 1998., pp. 177-184.

* cited by examiner

SYSTEM AND METHOD FOR PROBLEM ANALYSIS

RELATED APPLICATIONS

The present application, while not claiming priority to, may be related to the following United States patent applications: U.S. patent application Ser. No. 11/258,250, filed Oct. 24, 2003, titled "Semantic Processor for Recognition of Cause-Effect Relations in Natural Language Documents;" U.S. patent application Ser. No. 10/208,941, filed Jul. 31, 2002, titled "Computer Based Summarization of Natural Language Documents," (published as U.S. Patent App. Pub. No. 20030130837 on Jul. 10, 2003); U.S. patent application Ser. No. 10/737,147, filed Dec. 15, 2003 (U.S. Patent Appl. Pub. No. 20050131874, published Jun. 16, 2005) and U.S. patent application Ser. No. 10/723,633, filed Nov. 26, 2003 (U.S. Patent Appl. Pub. No. 20050114282, published May 26, 2005). These applications are incorporated herein by reference in their entirety.

BACKGROUND

1. Field

This application relates to systems and methods of automatic knowledge search for access to information stored in computer-based database systems. More specifically, the present application relates to knowledge searches based on accessing information contained in data bases of cause-effect relationships.

2. Description of Related Art

The process of innovation within organizations remains largely untouched by the general trend toward improved efficiency through automation. The traditional model of stimulating innovative thought is through the application of psychological techniques such as brainstorming. These techniques bring limited improvement to the process.

More recently, there have emerged a number of computer based technologies which can be applied by a researcher or designer who is considering the creation or improvement of a device, process, or other system. These technologies can be defined as problem analysis tools.

Problem analysis tools assist the user by enabling the user to consider a complex system and identify discrete problems which should be addressed. These tools accomplish this by providing computer based interfaces which assist in the application of well understood methods of problem analysis including, but are not limited to, root cause analysis, TRIZ, value engineering, function analysis, and system benchmarking. An example of such a tool, called TechOptimizer™, is a computer system marketed by Invention Machine Corporation of Boston, Mass. The technology used in TechOptimizer™ to assist in problem analysis is partially described in U.S. Pat. No. 6,056,428 and U.S. Pat. No. 6,202,043. The system disclosed in these two patents is fully described in TechOptimizer™ user guide, version 4.0, Invention Machine Corporation, Boston, Mass.

The TechOptimizer™ software suite includes a module, which allows a user to build a functional model of the design and/or technological process, to perform value diagnostics of the design and/or technological process, identify a better (for example, higher value) configuration of the design and/or technological process, and identify what problem has to be solved in order to implement this new configuration.

The deficiency with problem analysis tools is that while they greatly aid in the identification of specific issues to be addressed, they do not provide solutions to the identified problems. In U.S. Patent Appl. Pub. No. 20050114282, "Method for Problem Formulation and for Obtaining Solutions from a Data Base," a method for problem formulation and for obtaining solutions from a data base is described wherein a problem statement is automatically extracted from a machine representation of a system, the problem statement is reformulated as a natural language query, the query is submitted to a database, and the results of the query are returned thereby greatly facilitating the process of locating solutions to problems.

However, there exists a class of situations in the use of problem analysis tools which do not yield to the technique above. In these situations a researcher or designer must consider a specific event and consider either the causes of that event or the effects created by that same event.

This can be easily understood by considering the process of the method of situation analysis commonly referred to as root cause analysis. In this analytical process, the researcher may begin with a statement of an undesirable event which is under investigation, for example "product sales are declining." The researcher will then consider what the possible causal events of the undesirable event are. It may be the case that the researcher identifies as causal events: competitor gaining market share, customers have difficulty in finding product, and customer perceives decline in product quality. The research will then consider for each of the cited causal events what are the possible causal events of the identified causal events. The researcher will continue with iterative analysis until a set of events are identified which represent potentially solvable causes of the original undesirable event. This type of analysis is very effective and in wide use. However, it is also difficult because the research has no well defined methods for identifying the causes of events and is largely dependant on personal domain knowledge.

A similar problem exists in identifying the effects of a known situation. For example in the discipline commonly known as Failure Mode Effect Analysis (FMEA), the researcher will identify a number of known modes of failure of a system. The researcher must then for each failure mode articulate the effects of this failure mode. Just as with the case of the researcher performing a root cause analysis, the FEMA researcher is left to rely on personal domain knowledge to identify the effects of any particular failure mode.

In both of these situations, if the user does not have adequate domain knowledge, the user must conduct independent research using whatever means are available to find useful information. These means could include using books, public internet search engines, private data subscription services, internal enterprise portals, or other sources of relevant technical information.

SUMMARY

Embodiments of the present invention provide a method and system for using computer based systems to provide automated knowledge search capabilities in conjunction with problem analysis functions. In accordance with the principles of this invention, in one embodiment, problem analysis tools are augmented by the inclusion of knowledge search capabilities for databases, such that when a cause or effect statement is identified, it is automatically re-formulated as a query to the databases, and responses to this query from the databases are automatically provided, the responses being specific events or other phenomena which are known to represent the other half of a causal-effect relationship. In this embodiment, the machine representation of an event generated by the problem analysis component is converted into a query appropriate to the available knowledge search technology. Different problem analysis tools will generate different specific machine representations, and similarly the target query format will vary with the knowledge search technologies applied. For example, a natural language query is suitable for search engines using semantic algorithms and a key word query for less sophisticated engines. There are a number of specific techniques which may be used to perform the mapping from a specific machine representation to a desired query, such techniques consisting of the steps of extracting key elements from the machine representation of the problem statement and subsequently reformulating those extracted elements to form a properly formed query.

In particular embodiment of a tool that facilitates root cause analysis, the problem statement is reformulated by translating a statement of an effect (event) into a query. In another embodiment of a tool that facilitates failure mode effects analysis, the problem statement is reformulated by translating a cause (failure mode) statement into a natural language query.

BRIEF DESCRIPTION OF THE DRAWINGS

FIG. 2 shows a user interface for analyzing engineering systems via FMEA.

DETAILED DESCRIPTION

Figure 5:
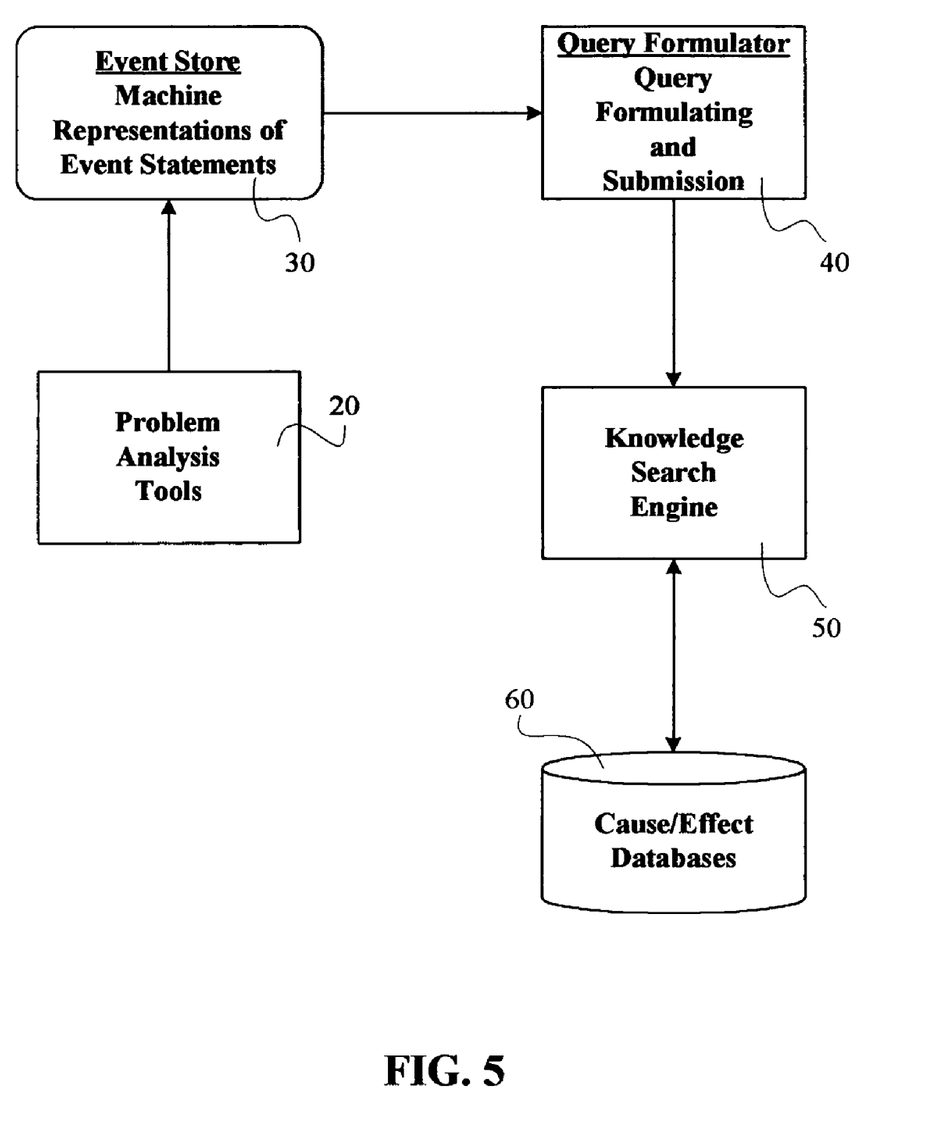
FIG. 5 is a high-level architecture diagram of an embodiment of the present invention.

FIG. 5 shows a high-level architecture for a system according to an embodiment of the present invention. The system 10 depicted in FIG. 5 comprises: Analysis Tools 20, i.e., tools for problem analysis such as those depicted in FIGS. 1 and 2 described in additional detail below; an Event Store 30, which comprises machine representations of models containing event statements; a Query Formulator 40, which performs query formulation and submission; a Knowledge Search Engine 50 that comprises selected one or more knowledge search engines; and searchable Cause/Effect Databases 60. The Analysis Tools 20 provides for analysis of specific problems, resulting in a machine readable representations of one or more models corresponding to the problem or problems being analyzed and containing event statements. The Event Store 30 contains the machine readable model representations that can be further processed in accordance with embodiments of the present invention. The Query Formulator 40, using elements extracted from specific event statements determined from the models in the Event Store 30, transforms the elements into queries for use by the Knowledge Search Engine 50 in extracting information from the Cause/Effect Databases 60.

Figure 6:
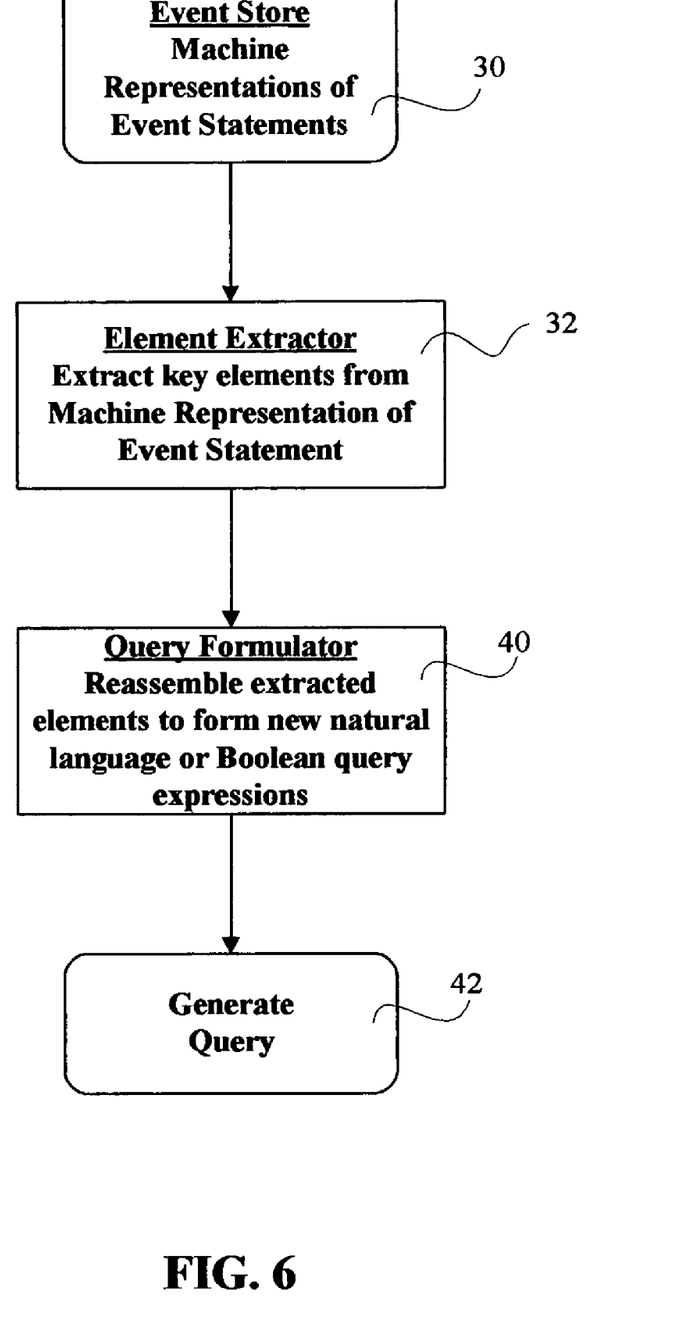
FIG. 6 is a flow diagram of a system in accordance with an embodiment of the present invention.

FIG. 6 shows a flow diagram that more specifically illustrates processing steps according to an embodiment of the present invention. The Event Store 30 contains models that contain one or more event statements, requiring further processing. The Element Extractor 32 identifies specific event statements from the Event Store and processes the event statements to extract key elements, such as what is the acting component or affected component described in the event and which half of a cause-effect relationship is represented by the event statement. The Query Formulator 40 assembles the key elements to form a natural language or Boolean query 42. The query is then submitted to the Knowledge Search Engine 50 (as shown in FIG. 5), which implements searching of a database 60 (such as a semantically indexed database) for information relevant to the query. Responses to the query may be automatically provided to a user in a graphical or text format.

Embodiments of the present invention enhance the use of various problem analysis tools by providing the ability to analyze and process event statements related to problems to be analyzed. This enhancement is provided by, for example, the ability to access knowledge bases outside of a user's local knowledge domain. One type of problem analysis tools used in accordance with embodiments of the present invention are root cause analysis tools. Other problem analysis tools, such as failure mode effects analysis tools, may be used in accordance with other embodiments of the present invention.

As indicated above, a Knowledge Search Engine 50 is used to extract information from databases. The Knowledge Search Engine 50 comprises one or more knowledge search tools. Knowledge search tools (also commonly referred to as search engines or database query tools) facilitate the efficient access to information stored in computer based database systems. When applicable, a knowledge search tool and a database to be searched by it are defined herein as a knowledge base. The user is able to locate relevant information by presenting a properly constructed query in an appropriate form (e.g. natural language or Boolean expression) to the knowledge search tool which searches the database and obtains results. The knowledge search tool responds to the entered query by constructing a result set comprising a list of information that meets the relevancy criteria imposed by the knowledge search tool. An example of such a knowledge search tool is a computer based system called Goldfire Intelligence™ marketed by Invention Machine Corporation, Boston, Mass. The technology used in this tool is partially described in U.S. Pat. No. 6,167,370, the content of which is incorporated herein by reference.

An embodiment of this invention uses the semantic indexing and search technology described in U.S. Pat. No. 6,167,370 for the purpose of performing knowledge searches. It will be apparent to the skilled practitioner that any other knowledge search tool could be used in an alternative embodiment.

As indicated above, the Query Formulator 40 provides queries to the Knowledge Search Engine 50 for the extraction of information from databases. In one embodiment, the machine representation of an event statement is used as the source of key elements with which to build a query. The type of actions taken by the Query Formulator 40 can be shown by example in reference to the problem analysis tools depicted in FIGS. 1 and 2.

Figure 1:
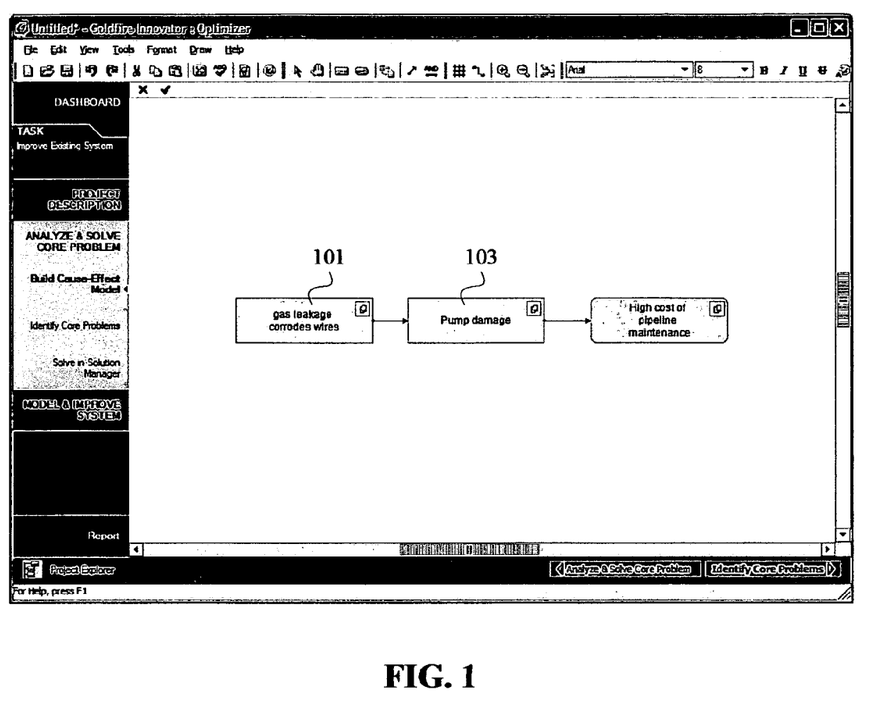
FIG. 1 shows a user interface for analyzing engineering systems via root cause analysis.

FIG. 1 illustrates the use of root-cause analysis for problem analysis. FIG. 1 shows a screen from the Goldfire Innovator™ program described above. In FIG. 1, the box 101 labeled "gas leakage corrodes wires," which is connected by an arrow to the box 103 labeled "pump damage," represents the causal relationship wherein the event "gas leakage corrodes wires" is a possible cause of the event "pump damage."

Figure 3:
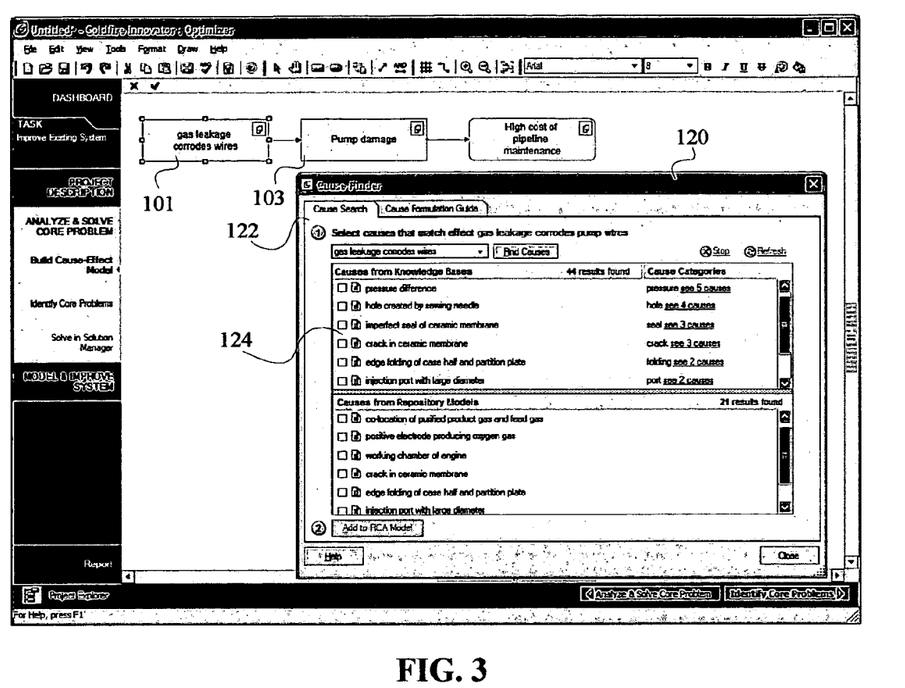
FIG. 3 shows a user interface of an embodiment of the present invention for problem analysis based on root cause analysis.

FIG. 3 shows how this root-cause analysis information may be used by an embodiment of the present invention to find a potential cause. In FIG. 3, the box 101 labeled "gas leakage corrodes wires" is interpreted as an undesired event.

A Cause Finder window 120 provides proposed events which represent possible causes of the undesirable event. Based on the interpretation of the event "gas leakage corrodes wires," the system constructs the query "gas leakage corrodes wires" as a query to be submitted to a knowledge search tool by automatic reformulation by translating the undesirable event statement into a natural language query. The query is shown in the Cause Search portion 122 of the Cause Finder window 120.

FIG. 3 also shows the results from querying the Knowledge Bases with the natural language query. This search may be triggered by clicking on an icon to select a specific event and requesting assistance to identify possible causes by clicking on an icon. The software also allows configuration by a user to, for example, rewrite the Query, and to limit the search. FIG. 3 shows the completed search with relevant possible cause results from the knowledge bases listed in the subpanels 124 below the query. A user can then further elect to capture the specific causes in the root cause analysis model of the problem.

Various types of knowledge bases may be accessed in response to a query and these knowledge bases may be resident in various places. These knowledge bases are resident in three possible places. One set of knowledge bases is contained in the user's own computer memory, or portable memory devices such as CDs that can accessed at the user's location. Another set is called Corporate Knowledge, which is typically on one or more servers resident or privately accessible to user's within the organization such as a corporation. Another set is publicly accessible search engines and databases such as Google™ (a search engine) and the U.S. Patent and Trademark Office patent collection (a searchable database).

FIG. 3 shows examples of two types of knowledge bases that may be accessed to assist a user in the analysis of a problem. Subpanel 124 shows "Causes from Knowledge Bases" and "Causes from Repository Models." General document repositories that have been semantically indexed provide the "Causes from Knowledge Bases." "Causes from Repository Models" are provided from repository models that consist of stored models of prior problem analysis performed by users. Hence, embodiments of the present invention allow for problem analysis to be supported by more general knowledge represented by general document repositories and by more specific knowledge that leverages past analysis that is captured in the repository models.

It will be apparent to the skilled practitioner that in alternative embodiments the specific mechanism for extraction of key query elements from a given problem analysis tool's machine representation will vary with the tool as will the mechanism for construction of the automatically formed query. For example, FIG. 3 depicts a graphical representation corresponding to the results of using a problem analysis tool which automated the process of root cause analysis. In this situation, the result of the root cause analysis has a machine representation which is a directed graph wherein each node 101 of the graph represents an event statement and each edge (shown as arrows connecting the nodes) of the graph represents a cause-effect relationship. In this case, the machine representation of each problem statement contains a well formed natural language fragment. Thus, if the user wishes to understand possible causes of the event "gas leak corrodes wires", since the user has the presumed goal of identifying causes of the identified problem, by selecting the node "gas leak corrodes wires" the user gives the program an assignment to create the formulation of the query in which the node is translated into the query statement which it does by extracting the key event data ("gas leak" is the subject performing the action "corrodes" on the object "wires") and generating a query of the form "gas leak corrodes wires".

Figure 4:
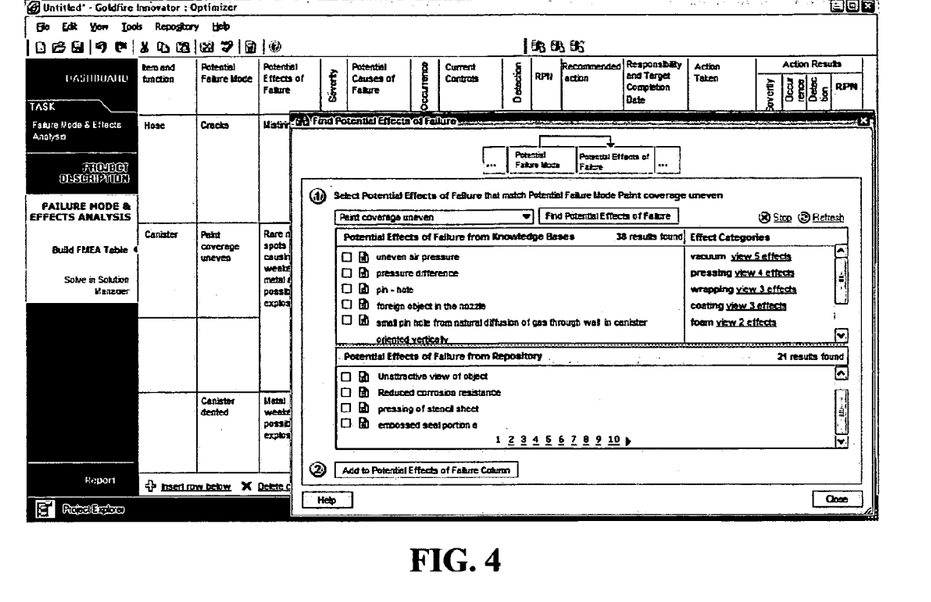
FIG. 4 shows a user interface of an embodiment of the present invention for problem analysis based on FMEA.

FIGS. 1 and 3 illustrate an application of an embodiment of the present invention in the context of Root Cause Analysis. As briefly discussed above, Root Cause Analysis may be used when a user is presented with an event statement for which related causes are to be identified. FIGS. 2 and 4 illustrate an application of an embodiment of the present invention in the context of FMEA. In this context, problem analysis supported by an embodiment of the present invention comprises determining potential effects caused by an event. In FIG. 2, one potential failure mode is identified as "Paint coverage uneven." FIG. 4 shows how an embodiment of the present invention supports analysis of this potential failure, by using the failure, i.e., event, to identify potential effects of that failure. Hence, in the context of Root Cause Analysis, embodiments of the present invention support analysis for determination of causes related to an event, while in the context of FMEA, embodiments of the present invention support analysis for determination of effects related to an event. However, those skilled in the art will understand that embodiments of the present invention may also be applied to analytic techniques other than Root Cause Analysis and FMEA.

Figure 7:
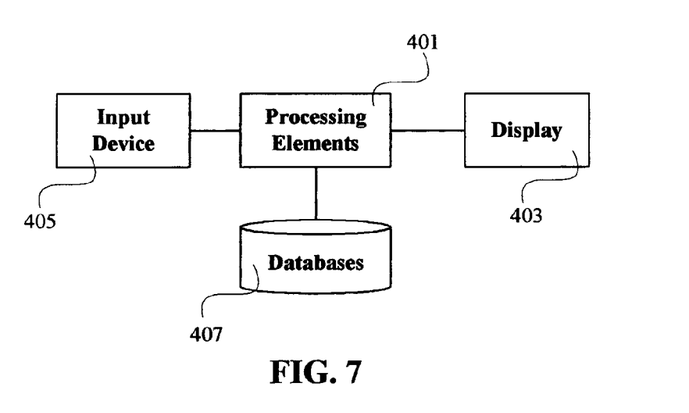
FIG. 7 shows an architecture diagram for a hardware implementation of an embodiment of the present invention.

Embodiments of the present invention may be implemented in typical computer systems, such as the system shown in FIG. 7 comprising a processing element 401, a display 403, an input device 405, and a link to databases 407 that provide the necessary information to provide responses to queries. Embodiments of the present invention may also be provided by computer-executable instructions resident on one or more computers, microprocessors, microcontrollers, or other processing devices. The computer-executable instructions for executing the system and method may be resident in memory in the processing devices or may be provided to the processing devices by floppy disks, hard disks, compact disk (CDs), digital versatile disks (DVDs), read only memory (ROM), or any other storage medium.

Since it is the case that relevant knowledge needed to analyze the events identified through the use of a problem analysis tool often exist in the body of knowledge accessible via a knowledge search tool, this addition of these two new elements to the problem analysis tools present immediate and compelling benefits to the user. A new model of use is enabled wherein the operations of problem analysis and applied research are no longer disjoint activities. Now, a single operation is made available which allows users to dynamically find potentially relevant information outside the domain of knowledge of the user and required for a thorough analysis of events as they are identified. This results in greater productivity and accuracy of analysis as the tradition latency between event identification and cause or effect generation is eliminated, as is the dependency on the scope of the user domain knowledge.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . "

What is claimed is:

1. A method for problem analysis, the method performed in a computer having one or more processors accessing one or more knowledge bases having a cause/effect database stored in at least one storage device with cause and effect elements stored in the cause/effect database, the method comprising:

obtaining a representation of a problem and determining an event statement from models in an event store based on the representation, and automatically determining which half of a cause-effect relationship is represented by the event statement and extracting elements from the event statement to determine a cause element or an effect element as half of the cause-effect relationship;

using the determined cause element or effect element, automatically formulating a query to include the determined cause element or the determined effect element;

submitting the formulated query to the one or more knowledge bases to determine one or more complete cause-effect relationships, including:

if the query includes the determined cause element, locating one or more effect elements that form one or more complete cause-effect relationships with the determined cause element of the query, or if the query includes the determined effect element, locating one or more cause elements that form one or more complete cause-effect relationships with the determined effect element of the query; and outputting the one or more cause-effect relationships by presenting the determined cause element or effect element of the query with the located one or more effect elements or cause elements from the one or more knowledge bases.

2. The method according to claim 1, including determining whether the event representation provides the cause element of the cause-effect relationship or the effect element of the cause-effect relationship prior to formulating the query.

3. The method according to claim 1, wherein submitting the query to the one or more knowledge bases comprises formulating the query to be compatible with a knowledge search engine prior to submitting the query.

4. The method according to claim 3, including formatting the query as either a natural language query or a key word query.

5. The method according to claim 3, wherein knowledge search engine comprises a semantic indexing and search tool and the one or more knowledge bases comprise a semantic analysis knowledge base.

6. The method according to claim 2, wherein the problem analysis comprises a root cause analysis and the event representation provides an effect element and the one or more knowledge bases locates one or more cause elements.

7. The method according to claim 2, wherein the problem analysis comprises a failure mode effects analysis and the event representation provides a cause element and the one or more knowledge bases locates one or more effect elements.

8. The method according to claim 1, wherein the one or more knowledge bases comprise one or more knowledge bases selected from a group consisting of: one or more locally accessible knowledge bases; one or more knowledge bases containing corporate knowledge; and one or more publicly accessible knowledge bases.

9. The method according to claim 1, further comprising graphically linking the event representation to the one or more cause elements or to the one or more effect elements.

10. The method according to claim 1, wherein the one or more knowledge bases comprises a plurality of cause-effect databases.

11. The method of claim 1, wherein the one or more knowledge bases includes a first knowledge base and a second knowledge base, and the method includes:

graphically presenting the determined cause element or effect element from the query in one portion of a computer screen; and on the computer screen, graphically distinguishing the located one or more effect elements or cause elements that complete the cause-effect relationships from the first knowledge base from the located one or more effect elements or cause elements that complete the cause-effect relationships from the second knowledge base.

12. A computer program product comprising at least one computer-readable medium having computer-executable instructions stored thereon that are accessible by at least one processor for performing a problem analysis method comprising:

providing one or more knowledge bases that include a cause/effect database having cause and effect elements stored in the cause/effect database;

obtaining a representation of a problem and determining an event statement from models in an event store based on the representation, determining which half of a cause-effect relationship is represented by the event statement and extracting elements from the event statement to determine a cause element or an effect element as half of the cause-effect relationship;

using the determined cause element or effect element, formulating a query to include the determined cause element or the determined effect element;

submitting the formulated query to the one or more knowledge bases to determine one or more complete cause-effect relationships, including:

if the query includes the determined cause element, locating one or more effect elements that form one or more complete cause-effect relationships with the cause element of the query, or if the query includes the determined effect element, locating cause elements that form one or more complete cause-effect relationships with the effect element of the query; and outputting the one or more causes-effect relationships by presenting the determined cause element or effect element of the query with the located one or more effect elements or cause elements from the one or more knowledge bases.

13. A system for problem analysis comprising:
a computer program stored within a computer-readable storage medium for execution on a computer system, the computer system comprising:
one or more computer processing elements;
one or more display devices;
one or more user input devices; and
communication elements for communicating with the one or more databases;
one or more cause/effect databases having cause and effect elements stored in the cause/effect database;
an event store comprising an element extractor and models having one or more event statements, wherein, based on a machine representation of a problem, the element extractor identifies an event statement from the models and determines which half of a cause-effect relationship is represented by the event statement and extracts elements from the event statement to determine a cause element or an effect element as half of the cause-effect relationship;
a query formulator configured to generate a query based on the determined cause element or the determined effect element; and
a knowledge search engine configured to determine one or more complete cause-effect relationships, wherein the knowledge search engine is adapted to:
receive the query;
search the one or more cause/effect databases to:
locate one or more effect elements that form complete cause-effect relationships with the determined cause element of the query, or
locate one or more cause elements that form complete cause-effect relationships with the determined effect element of the query; and
output the one or more causes-effect relationships by presenting the determined cause element or effect element of the query with the located one or more effect elements or cause elements from the one or more knowledge bases.

14. The system according to claim 13, wherein the element extractor is configured to extract either the cause element or the effect element from the at least one event statement.

15. The system according to claim 13, wherein the query formulator is configured to format the query to be compatible with the knowledge search engine.

16. The system according to claim 15, wherein the query is formatted as either a natural language query or a key word query.

17. The system according to claim 13, wherein the knowledge search engine comprises a semantic indexing and search tool and the one or more databases comprise one or more semantic analysis knowledge base.

18. The system according to claim 14, further comprising one or more problem analysis tools.

19. The system according to claim 18, wherein the problem analysis tools are configured to perform root cause analysis and the element extractor is configured to identify an effect element in the at least one event statement.

20. The system according to claim 18, wherein the problem analysis tools are configured to perform failure mode effects analysis and the element extractor is configured to identify a cause element in the at least one event statement.

21. The system according to claim 18, further comprising a graphical user interface configured to enable a user to interact with the system.

22. The system according to claim 13, wherein the one or more databases comprise one or more databases selected from a group consisting of: one or more locally accessible databases; one or more databases containing corporate knowledge; and one or more publicly accessible databases.

23. The system according to claim 13, wherein the one or more databases comprises a plurality of cause-effect databases.

* * * * *